US008543720B2

(12) United States Patent
Wormley et al.

(10) Patent No.: US 8,543,720 B2
(45) Date of Patent: Sep. 24, 2013

(54) DYNAMIC BIT RATE SCALING

(75) Inventors: Nicholas Wormley, St. Paul, MN (US);
Ryan Brase, Minneapolis, MN (US);
Justin F. Chapweske, Fridley, MN (US)

(73) Assignee: Google Inc., Mountain VIew, CA (US)

( * ) Notice: Subject to any disclaimer, the term of this patent is extended or adjusted under 35 U.S.C. 154(b) by 121 days.

(21) Appl. No.: 12/328,139

(22) Filed: Dec. 4, 2008

(65) Prior Publication Data
US 2009/0150557 A1 Jun. 11, 2009

Related U.S. Application Data

(60) Provisional application No. 60/992,471, filed on Dec. 5, 2007.

(51) Int. Cl.
*G06F 15/16* (2006.01)

(52) U.S. Cl.
USPC .......................................... 709/231; 709/226

(58) Field of Classification Search
USPC .................................. 709/231, 226
See application file for complete search history.

(56) References Cited

U.S. PATENT DOCUMENTS

| 4,881,264 A | 11/1989 | Merkle |
| 5,822,537 A | 10/1998 | Katseff et al. |
| 5,953,506 A | 9/1999 | Kalra et al. |
| 6,141,659 A | 10/2000 | Barker et al. |
| 6,195,680 B1 * | 2/2001 | Goldszmidt et al. .......... 709/203 |
| 6,339,785 B1 | 1/2002 | Feigenbaum |
| 6,477,522 B1 | 11/2002 | Young |
| 6,601,136 B2 | 7/2003 | Gunaseelan et al. |
| 6,742,023 B1 | 5/2004 | Fanning et al. |
| 6,771,674 B1 | 8/2004 | Schuster et al. |
| 6,772,337 B1 | 8/2004 | Yener |
| 6,937,770 B1 * | 8/2005 | Oguz et al. ..................... 382/235 |
| 7,047,309 B2 | 5/2006 | Baumann et al. |
| 7,058,721 B1 * | 6/2006 | Ellison et al. ................. 709/231 |
| 7,069,014 B1 | 6/2006 | Thenthiruperai et al. |
| 7,133,368 B2 | 11/2006 | Zhang et al. |
| 7,185,082 B1 | 2/2007 | del Val et al. |

(Continued)

FOREIGN PATENT DOCUMENTS

| EP | 0911728 | 4/1999 |
| EP | 1 298 931 A2 | 4/2003 |

(Continued)

OTHER PUBLICATIONS

Sun, et al., "Seamless Switching of Scalable Video Bitstreams for Efficient Streaming" IEEE Transaction on Multimedia, vol. 6 No. 2, Jul. 2006 pp. 291-303.*

(Continued)

*Primary Examiner* — Kevin Bates
(74) *Attorney, Agent, or Firm* — Turocy & Watson, LLP

(57) ABSTRACT

The invention provides for a download agent executing on a computing device to dynamically select between media files with different media quality for delivery of media content provided by a media content provider. The download agent may select between different media files with similar content but different quality based on a playback rate of the media file, the resolution of the media file, or the encoding scheme of the media file. The download agent may seamlessly transition from one media file to another media file at key frames to avoid any motion artifacts and to avoid requiring a user to restart the media file.

20 Claims, 4 Drawing Sheets

(56) References Cited

U.S. PATENT DOCUMENTS

| | | | |
|---|---|---|---|
| 7,251,691 | B2 | 7/2007 | Boyd et al. |
| 7,277,621 | B2 | 10/2007 | Kunieda et al. |
| 7,277,950 | B1 | 10/2007 | Chapweske |
| 7,555,559 | B2 | 6/2009 | Chapweske |
| 7,962,637 | B2 * | 6/2011 | Su et al. .................. 709/231 |
| 8,250,191 | B2 * | 8/2012 | Hickmott et al. ............ 709/223 |
| 8,346,225 | B2 * | 1/2013 | Raleigh .................. 455/414.1 |
| 2001/0051996 | A1 | 12/2001 | Cooper et al. |
| 2002/0002708 | A1 | 1/2002 | Arye |
| 2002/0003541 | A1 | 1/2002 | Boyd et al. |
| 2002/0042924 | A1 | 4/2002 | Adams |
| 2002/0049760 | A1 | 4/2002 | Scott et al. |
| 2002/0049846 | A1 | 4/2002 | Horen et al. |
| 2002/0065922 | A1 * | 5/2002 | Shastri .................. 709/231 |
| 2002/0095400 | A1 * | 7/2002 | Johnson et al. ................ 707/1 |
| 2002/0108112 | A1 | 8/2002 | Wallace et al. |
| 2002/0133247 | A1 * | 9/2002 | Smith et al. .................. 700/94 |
| 2002/0138443 | A1 | 9/2002 | Schran et al. |
| 2002/0161909 | A1 | 10/2002 | White |
| 2002/0170067 | A1 * | 11/2002 | Norstrom et al. ............ 725/109 |
| 2003/0067872 | A1 | 4/2003 | Harrell et al. |
| 2003/0123546 | A1 * | 7/2003 | Falik et al. ............... 375/240.12 |
| 2004/0064573 | A1 | 4/2004 | Leaning et al. |
| 2004/0078470 | A1 | 4/2004 | Baumeister et al. |
| 2004/0093396 | A1 * | 5/2004 | Akune .................. 709/219 |
| 2004/0111526 | A1 * | 6/2004 | Baldwin et al. ............... 709/231 |
| 2004/0184774 | A1 | 9/2004 | Kunieda et al. |
| 2004/0193900 | A1 | 9/2004 | Nair |
| 2004/0205093 | A1 | 10/2004 | Li et al. |
| 2004/0267503 | A1 * | 12/2004 | Batterberry et al. .......... 702/188 |
| 2004/0267940 | A1 | 12/2004 | Dideriksen et al. |
| 2005/0010792 | A1 | 1/2005 | Carpentier et al. |
| 2005/0021575 | A1 | 1/2005 | Boyd et al. |
| 2005/0102371 | A1 | 5/2005 | Aksu |
| 2005/0165849 | A1 | 7/2005 | Moradi et al. |
| 2005/0183120 | A1 | 8/2005 | Jain et al. |
| 2006/0026161 | A1 | 2/2006 | Henseler |
| 2006/0235883 | A1 | 10/2006 | Krebs |
| 2007/0078876 | A1 | 4/2007 | Hayashi et al. |
| 2007/0088844 | A1 | 4/2007 | Seims |
| 2007/0157267 | A1 | 7/2007 | Lopez-Estrada |
| 2007/0261072 | A1 | 11/2007 | Boulet et al. |
| 2008/0040497 | A1 * | 2/2008 | Venkatramani et al. ...... 709/231 |
| 2008/0046917 | A1 | 2/2008 | de Heer |
| 2008/0050096 | A1 | 2/2008 | Ryu |
| 2008/0104121 | A1 | 5/2008 | Gottlieb et al. |
| 2008/0140720 | A1 | 6/2008 | Six et al. |
| 2008/0141317 | A1 | 6/2008 | Radloff et al. |
| 2008/0201416 | A1 | 8/2008 | Lipton |
| 2009/0180430 | A1 | 7/2009 | Fadell |
| 2009/0185619 | A1 | 7/2009 | Taleb et al. |
| 2009/0328124 | A1 * | 12/2009 | Khouzam et al. ............ 725/116 |
| 2010/0023579 | A1 * | 1/2010 | Chapweske et al. .......... 709/203 |
| 2010/0191656 | A1 | 7/2010 | Martin et al. |

FOREIGN PATENT DOCUMENTS

| | | |
|---|---|---|
| EP | 1298931 A2 * | 4/2003 |
| EP | 1605460 | 12/2005 |
| EP | 1 638 333 A1 | 3/2006 |
| EP | 1848214 | 10/2007 |
| GB | 2374746 | 10/2002 |
| GB | 2 395 387 A | 5/2004 |
| JP | 2003067284 | 3/2003 |
| WO | 2007063430 | 6/2007 |
| WO | WO 2007/063430 A2 | 6/2007 |
| WO | 2009075766 | 6/2009 |

OTHER PUBLICATIONS

Rejaie et al., "Architectural Considerations for Playback of Quality Adaptive Video Over the Internet", Proceedings IEEE International Conference on Networks, Sep. 2000, (pp. 204-209).
Wang, "Traffic Regulation under the Percentile-Based Pricing Policy", Proceedings of the First International Conference on Scalable Information Systems, Jun. 2006, (8 pages).
Duffield et al., "Issues of Quality and Multiplexing When Smoothing Rate Adaptive Video", IEEE Transactions on Multimedia, vol. 1, No. 4, Dec. 1999, (13 pgs.).
Gürses et al., "A Simple and Effective Mechanism for Stored Video Streaming with TCP Transport and Server-Side Adaptive Frame Discard", Computer Networks, 48, Dec. 30, 2004, (pp. 489-501).
Birney, "Intelligent Streaming", Inside Windows Media, Nov. 19, 1999, XP-002177089, (9 pgs.).
U.S. Appl. No. 12/463,971, entitled "Live Media Delivery Over a Packet-Based Computer Network," filed May 11, 2009.
Notification of Transmittal of the International Search Report and the Written Opinion of the International Searching Authority, or the Declaration for corresponding patent application No. PCT/US2008/013368, mailed Jun. 4, 2009, 14 pages.
U.S. Appl. No. 12/486,589, entitled "Dynamic Media Bit Rates Based on Enterprise Data Transfer Policies," filed Jun. 17, 2009.
Kaminsky, D., "Vectorcast: A Proposal Regarding the efficient Distribution of Data on High Bandwidth Networks," Jan. 12, 1998, 4 pages.
Francis, P., "Yallcast: Extending the Internet Multicast Architecture," Sep. 30, 1999, pp. 1-39.
Byers, J. et al., "Accessing Multiple Mirror Sites in Parallel: Using Tornado Codes to Speed Up Downloads," Apr. 1999, pp. 275-283.
Dessent, Brian, "Brian's BitTorrent FAQ and Guide", May 10, 2003, accessed from http://www.dessent.net/btfaq, 40 pgs.
U.S. Appl. No. 61/119,854 entitled "Adaptive Playback Rate With Look-Ahead," filed Dec. 4, 2008.
Koman, Richard, "The Swarrncast Solution", May 24, 2001, accessed from http://openp2p.com/lpt/a/883, 4 pgs.
Padmanabhan et al., "Distributing Streaming Media Content Using Cooperative Networking", Proceedings of the 12th International Workshop on Network and Operating Systems Support for Digital Audio: NOSSDAV, May 12-14, 2002, pp. 177-186.
Byers et al., "A Digital Fountain Approach to Reliable Distribution of Bulk Data", Proc. ACM SIGCOMM, ACM Press, New York, 1998, pp. 56-67.
V.K. Goyal, "Multiple Description Coding: Compression Meets the Network", IEEE Signal Processing Magazine, vol. 18, 2001, pp. 74-93.
Chu et al., "A Case for End System Multicast", Proceedings ACM SIGMETRICS 2000: International Conference on Measurement and Modeling of Computer Systems, Jun. 17-21, 2001, pp. 1-12.
Notification Concerning Transmittal of International Preliminary Report on Patentability (Chapter I of the Patent Cooperation Treaty) for corresponding patent application No. PCT/US2008/013368, mailed Jun. 17, 2010, 9 pages.
U.S. Appl. No. 61/073,542, entitled "Dynamic Media Bit Rates Based on Enterprise Data Transfer Policies," filed Jun. 18, 2008.
U.S. Appl. No. 12/252,782, entitled "Media Playback Point Seeking Using Data Range Requests," filed Oct. 16, 2008.
U.S. Appl. No. 61/052,459, entitled, "Live Media Delivery Over a Packet-Based Computer Network", filed May 12, 2008.
U.S. Appl. No. 10/788,695, entitled "Parallel Data Transfer Over Multiple Channels With Data Order Prioritization," filed Feburary 27, 2004.
U.S. Appl. No. 61/119,854, entitled, "Adaptive Playback Rate With Look-Ahead", filed Dec. 4, 2008.
"Video Compression Picture Types", from Wikipedia, the free encyclopedia, http://en.wikipedia.org/w/index.php?title=Video_compression_picture_types&oldid=252563025, XP-002571418, printed Mar. 4, 2010, 5 pages.
Invitation to Pay Additional Fees and, Where Applicable, Protest Fee and Annex to the Invitation to Pay Additional Fees entitled "Communication Relating to the Results of the Partial International Search" mailed Feb. 12, 2009 for corresponding Application No. PCT/US2008/009489, (5 pages).
Notification of Transmittal of the International Search Report and the Written Opinion of the International Searching Authority, or the Declaration for corresponding patent application No. PCT/US2008/009489, mailed May 27, 2009, 16 pages.
Notice of Allowance for U.S. Appl. No. 12/187,472, dated Apr. 19, 2010, 19 pages.

U.S. Appl. No. 60/992,471, filed Dec. 5, 2007, entitled "Dynamic Bit Rate Scaling," by Wormley et al.

U.S. Appl. No. 61/052,459, filed May 12, 2008, entitled "Live Media Delivery Over a Packet-Based Computer Network," by Chapweske et al.

International Preliminary Report on Patentability from international application No. PCT/US2008/011801, dated Apr. 20, 2010, 8 pp.

Office Action for U.S. Appl. No. 12/252,782, dated Nov. 29, 2010, 12 pages.

Office Action from U.S. Appl. No. 12/252,782, dated May 16, 2011, 13 pp.

Response to Office Action dated May 16, 2011, from U.S. Appl. No. 12/252,782, filed Aug. 16, 2011, 20 pp.

Office Action from U.S. Appl. No. 12/486,589, dated May 31, 2011, 12 pp.

Response to Office Action dated May 31, 2011, from U.S. Appl. No. 12/486,589, filed Aug. 31, 2011, 19 pp.

Office Action for U.S. Appl. No. 12/252,782, dated Apr. 2, 2013, 25 pages.

* cited by examiner

DYNAMIC BIT RATE SCALING

This application claims the benefit of U.S. Provisional Application Ser. No. 60/992,471 filed Dec. 5, 2007, the entire contents of which is incorporated herein by reference.

TECHNICAL FIELD

The invention relates to computer networks and particularly to downloading media data on computer networks.

BACKGROUND

Media content providers provide media content to users via one or more computer networks. Generally, individual users (e.g., subscribers) receive media content from media content providers through one or more point to point network links and display the media content via a media player. The displaying of media content is referred to as playback.

Point to point network links have an established maximum throughput rate as measured in bits per second; the established maximum throughput rate owing to either underlying technology of the link or contracted service levels for the users. Actual throughput rate is the throughput rate at which the network and its point to point links actually convey the data from the content provider to the individual user. The actual throughput rate to the user may only be a fraction of the maximum throughput rate based on environmental conditions and competing network traffic.

Since the actual throughput rate may vary based on environmental conditions and competing network traffic, the rate at which a subscriber's media player must consume (i.e., receive and play) media over a network connection (be it a constant rate or an average rate) to achieve uninterrupted playback may exceed the actual network throughput bit rate from the media content provider. In these situations, the media player must pause to wait for more data from the media content provider to arrive before it can continue to playback the media content. This pause, often referred to as buffering or re-buffering can greatly diminish the enjoyment of media viewing. In other situations, the client device (i.e, the device used to display the media content to the subscriber), may have insufficient computing resources to decode and present the media content in "real-time." In these situations, portions of the media content may be discarded, undecoded, or unplayed so that the media player may maintain proper playback of the received media content. The playback may also slow down to present all the data of the media content, but at a reduced rate. Either the dropping of data or the slowing of playback can reduce enjoyment, and if excessive, render the media content unwatchable.

SUMMARY

In general, the invention provides a download agent executing on a computing device of a user (i.e., subscriber) to dynamically select between different playback rates for delivery of media content provided by a media content provider. As used herein the term "playback rate" refers to the rate at which the media content is played back by the computing device. For example, the subscriber-side download agent is capable of dynamically interrupting download and playback of current media content and initiating download of the same media at a different playback rate representation. The subscriber-side switch of playback rate presentation is forecasted and executed such that a seamless transition occurs from the current playback rate representation of the media to the new playback rate representation at the same time-based playback point within both representations.

In one embodiment, the invention is directed to a method comprising, determining playback status of a media player, selecting a different media file based on the playback status, determining whether current media file is at a key frame, and playing the different media file when current media file is at the key frame.

In another embodiment, the invention is directed to a download agent comprising, a playback controller coupled to a media player and a stream agent, the stream agent coupled to the media player and the playback controller, and a temporal metadata unit coupled to the stream agent.

In another embodiment, the invention is directed to a device comprising, a memory unit comprising a download agent, and at least one processor coupled to the memory unit, a presentation unit, and a network interface unit, wherein the download agent includes a playback controller coupled to a media player and a stream agent, the stream agent coupled to the media player and the playback controller, and a temporal metadata unit coupled to the stream agent.

In another embodiment, the invention is directed to a computer-readable medium containing instructions. The instructions cause a programmable processor to determine playback status of a media player, select a different media file based on the playback status, determine whether current media file is at a key frame, and play the different media file when current media file is at the key frame.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
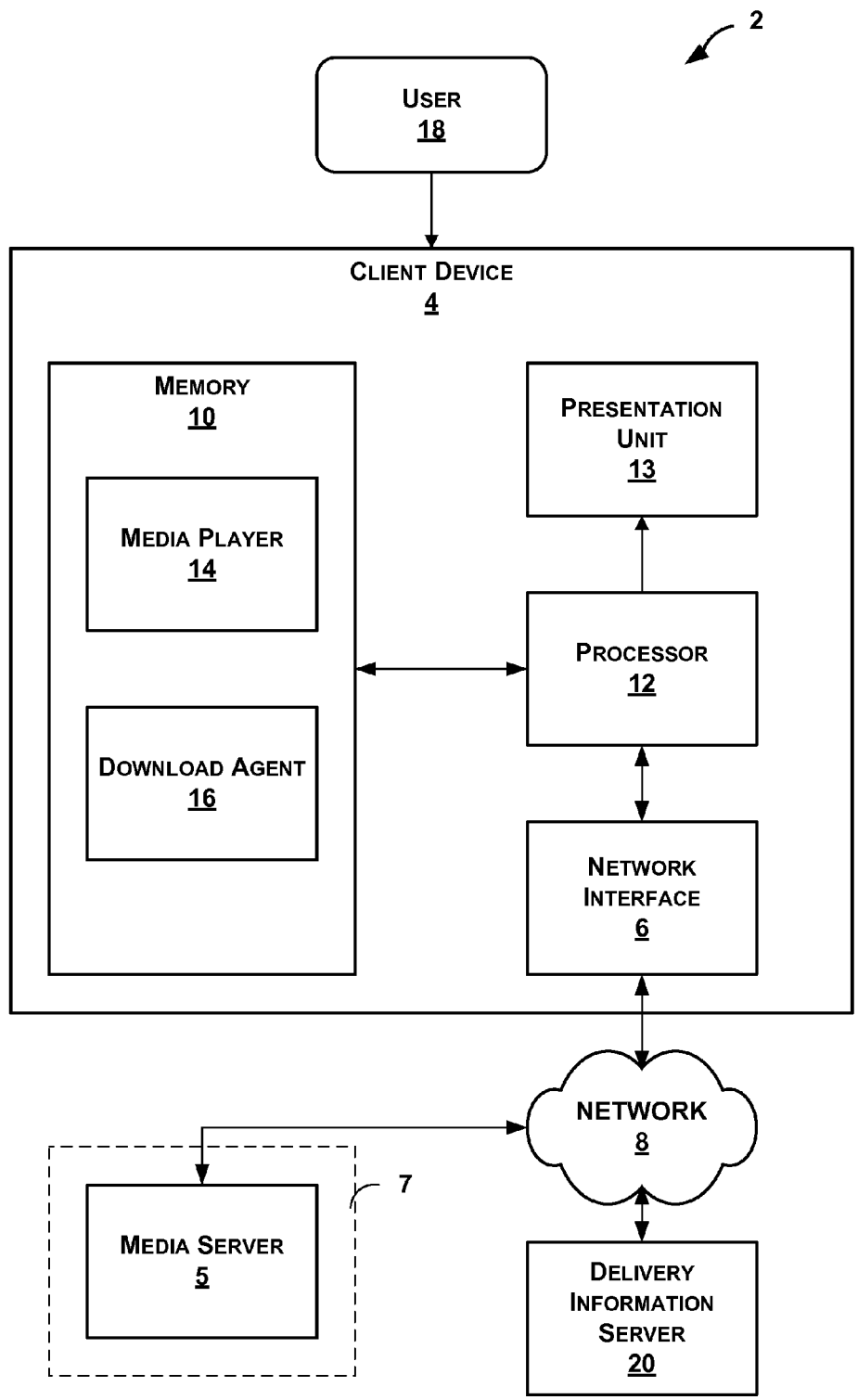
FIG. 1 is a block diagram illustrating an exemplary system in which a download agent dynamically selects media files from a media server.

A media server stores media content in a media asset (e.g. a media file). The server may be operated by a media content provider. The media asset may be encoded for a certain playback rate. The term "playback rate" as used herein refers to the rate at which a computing device should playback the media content. A computing device, such as a client device, downloads a media asset from the server and plays back the media asset via a media player. If the rate at which the client device receives the media asset from the server, i.e., throughput rate, is less than the rate at which the client device is playing back the media asset, i.e., playback rate, the media player may pause displaying the media asset, and may buffer or re-buffer additional data before it starts to display the media asset again. Notably, playback rate and throughput rate should not be confused. To reiterate, playback rate is the rate at which the computing device should playback the media content. Throughput rate is the rate at which the computing device receives the media content. As described above, in other situations, the client device (i.e, the device used to display the media content to the subscriber), may have insufficient computing resources to decode and present the media content in "real-time." In these situations, portions of the media content may be discarded, undecoded, or unplayed so that the media player may maintain proper playback of the received media content. The playback may also slow down to present all the data of the media content, but at a reduced rate. Either the dropping of data or the slowing of playback can reduce enjoyment, and if excessive, render the media content unwatchable.

One conventional technique utilized by media content providers to avoid buffering dropping of data, or slowing of playback includes providing the user with either the option of selecting an alternate playback rate (e.g., high or low quality) based on their particular point-to-point throughput rate or selecting a default playback rate. In accordance with the conventional technique, during playback if the selected playback rate or default playback rate exceeds the network throughput rate or the computing resources of the client device displaying the media content, the user has to explicitly begin playback of the media content at a reduced playback rate which can cause startup delay associated with buffering and can require the user to start from the beginning of the media content. Needing to restart from the beginning every time the selected playback rate or default playback rate exceeds the network throughput rate or the computing resources of the device can drastically reduce the enjoyment of the media content.

Another conventional technique utilized by media content providers to avoid buffering, dropping of data, or slowing of playback includes the media player transmitting playback status to the media content provider. The playback status can be the buffering time, the number of frames dropped, or the playback rate. The media content provider dynamically varies the playback rate of the media content to avoid buffering, dropping data, or slowing playback. However this conventional technique has the negative consequence of requiring a separate content stream tailored for each recipient.

In accordance with this disclosure, the media server may store different representation of the media asset as media files. Each of the media files contains substantially similar media content, but may be encoded for different playback rates. For example, a first media file may be encoded for a playback rate of 1 megabit per second. A second media file may contain substantially the same media content as the first media file, but may be encoded for a playback rate of 2 megabits per second.

In general, the invention provides a download agent executing on a computing device of a user (i.e., subscriber) to dynamically select between media files encoded for different playback rates for delivery of media content provided by a media content provider. For example, the subscriber-side download agent is capable of dynamically interrupting download and playback of current media content and initiating download of the same media at a different playback rate representation. The subscriber-side switch of playback rate presentation is forecasted and executed such that a seamless transition occurs from the current playback rate representation of the media to the new playback rate representation at the same time-based playback point within both representations. As a result, the transition is seamless to the end-user without introducing delay or jitter and without requiring restart of the content delivery, as is required in conventional techniques. Moreover, the subscriber-side initiation of the dynamic transition between playback rate representations may avoid any requirement that the subscriber device report download and playback quality to the media content provider or other listening server, as is required in conventional techniques.

In some instances, download agent may dynamically select between different media assets (e.g., media files) that contain substantially similar media content; however, the visual quality of the content may vary for the different media files. Generally, a media file that provides higher visual quality compared to other media files requires more bits to be displayed in the same amount of time compared to other media files. Accordingly, a higher visual quality media file is encoded for a higher playback rate compared to a lower visual quality media file. As described above, the media server may store media files that contain substantially the same media content, but are encoded for different playback rates. Accordingly, a media file encoded for a higher playback rate may provide better visual quality compared to a media file encoded for a lower playback rate even though the media file encoded for the higher playback rate contains substantially the same media content as the media file encoded for the lower playback rate.

In one example implementation, the download agent executing on the end user's computing device may dynamically select and transition between a higher quality media file and a lower quality media file based on the actual throughput rate of the network link over which the media content is received and/or utilization of the computing devices' resources. When the playback rate according to the "real time" of the context exceeds the actual throughput rate at which the context is downloaded, the download agent may automatically transition to a lower quality media file to prevent buffering or re-buffering. When the actual throughput rate at which the content is received exceeds the playback rate for a sufficient amount of time such that a threshold amount of content has been buffered and not yet played, the download agent may automatically select and transition to a higher quality media file. Similarly, the download agent may dynamically and seamlessly transition between media files of different quality based on the utilization of the client device computing resources relative to the actual throughput rate of the media content. For any of these transitions, the download agent forecasts the need for the transition, initiates the download from the media file at a location within the new media file other than the start of the media file such that the media content can be presented at the new playback rate at the determined cut-over point.

In one implementation, the download agent executing on the user's machine coordinates and initiates dynamic transition such that the cut-over between playback rates occurs at a video frame in both the original and new playback rate representations that is not dependent on other video frames within the stream. For example, the download agent may forecast and initiate the download of the media content at the new playback rate such that the switchover can occur at a subsequent (i.e, not yet played) frame within the media content; such frame being a "key frame" or "intra picture" or "intra frame" in the media for which the encoding is not based on a reference to any other picture or frame.

For example, various media content providers may have one or more media files each having similar content, but the quality and playback rate of each file may vary. In the context of video, each media file contains a plurality of frames in accordance with a video compression scheme. One such frame is referred to as a key frame or intra picture that can be decoded without reference to other frames and may, for example, provide an entire encoded picture. The term "key frame" is used herein to generally refer to this type of frame within an encoded media stream. Other types frames that may be encoded within the stream include predicted pictures or bi-predicted pictures that generally contain image data and motion vector displacements that are relative to a previous key frame in the stream. As described herein, the download agent executing on the user's machine coordinates and initiates dynamic transition such that the cut-over between playback rates occurs at a video frame that is not dependent on other video frames within the stream, i.e., a key frame.

Dynamically selecting and splicing media from different media files with similar media content but varying quality may provide the advantage of avoiding buffering, dropping of data, or slowing of playback. Moreover, the techniques also avoid any requirement that the user restart the media file from beginning when the actual throughput rate is not ideal. Furthermore, the techniques described herein allows the media content to seamlessly transition from the original playback rate to a new playback rate so that the time-based playback point is the same in both media contents at the time of cut-over. This allows varying the playback rate without creating jerkiness, missed portions of the media, duplicate portions of the media, or other motion artifacts.

Furthermore, the communication between the server and client device need not be completely customized for the user. This allows for high cache efficiency by keeping the responses for all users identical for the ranges of data being requested form the media files.

FIG. 1 is a block diagram illustrating an exemplary system in which a download agent dynamically selects media files from a media server. As illustrated in the example of FIG. 1, system 2 includes a client device 4. Client device 4 may be a wide variety of different types of devices. For example, client device 4 may be a personal computer, a laptop computer, a mobile telephone, a personal media player, a device integrated into a vehicle, a network telephone, a network television, a television set-top box, a network appliance, or another type of network device.

In addition, system 2 includes a media server 5 that is operated by a media content provider (MCP) 7. MCP 7 may be an enterprise or other organization that provides media content to client devices. For example, MCP 7 may be a corporation that runs a web site that allows users to post and share video clips.

Media server 5 is capable of providing multiple versions of a media asset. As used in this disclosure, a "media asset" is a set of media data (e.g., a media file) that client device 4 can download and play back to user 18. Example media assets include video clips, audio clips, movies, live audio streams, live video streams, teleconference streams, telephone streams, digital cinema feeds, and other types of media. In the context of system 2, media server 5 may, for example, be capable of providing multiple versions of the same episode of a television show. The versions of the media asset may differ only in audio and/or video quality.

Each of the versions of the media asset may be associated with a different playback rate. In general, the lower the playback rate of a media asset, the lower the quality of the media asset. For example, an audio object having a playback rate of 32 kbits/second (i.e., AM radio quality) may have lower audio quality than an audio object having a playback rate of 320 kbits/second (i.e., near CD quality).

As illustrated in the example of FIG. 1, system 2 may include a network 8 that facilitates communication between client device 4 and media server 5. Network 8 may be a wide variety of different types of networks. For example, network 8 may be the Internet, a content-delivery network, a wide-area network, or another type of network. MCP 7 may purchase rights to communicate on network 8 from a network service provider. The network service provider may be an Internet Service Provider (ISP) or a similar organization.

In the example of FIG. 1, client device 4 includes a network interface 6, a memory 10, a processor 12, and a presentation unit 13. Network interface 6 facilitates communication between client device 4 and network 8. Network interface 6 may be a variety of different types of network interface. For example, network interface 6 may be an Ethernet interface, a WiFi interface, a token ring interface, a fiber optic interface, a Bluetooth interface, a Wireless Broadband interface, a WiMax interface, or another type of network interface. Memory 10 may be a computer-readable medium such as a Random Access Memory unit, a disk drive, an optical disc, a floppy disk, a Flash memory unit, or another type of computer-readable medium. Processor 12 may be a microprocessor that includes one or more cores, an application-specific integrated circuit (ASIC), co-processor, or another type of integrated circuit. Processor 12 may execute instructions stored in memory 10. When processor 12 executes instructions stored in memory 10, the instructions may cause processor 12 to perform one or more actions. Presentation unit 13 may be a computer monitor, a television set, an integrated video screen, speakers, digital signage, a video projector, or another type of unit capable of presenting media.

In the example of FIG. 1, memory 10 includes a media player 14 and a download agent 16. Media player 14 and download agent 16 may be sets of software instructions that, when executed cause processor 12 to perform various actions. For ease of explanation, when this disclosure states that media player 14 performs some action or states that download agent 16 performs some action, such phrases may be interpreted to mean that the instructions of media player 14 cause processor 12 to perform the action or to mean that the instructions of download agent 16 cause processor 12 to perform the action. However, it should be appreciated that in some implementations, media player 14 and/or download agent 16 may be implemented at least in part as hardware, in which case media player 14 and/or download agent 16 may perform some or all of the actions without any action by processor 12. Furthermore, it should be appreciated that in some implementations media player 14 and download agent 16 may be part of a common software package. In other words, the functionality of download agent 16 may be incorporated into media player 14.

A user 18 of client device 4 may interact with media player 14 when user 18 wants client device 4 to present a media asset. Example commercial media player applications include Windows Media Player™ from Microsoft Corporation of Redmond, Wash., Quicktime™ from Apple™ Computer of Cupertino, Calif., and Flash Video™ from Adobe Systems, Inc. of San Jose, Calif. User 18 may directly or indirectly instruct media player 14 to present a media asset. For example, user 18 may directly instruct media player 14 to present a media asset by inputting a Uniform Resource Locator associated with the media asset into a prompt presented by media player 14. In a second example, user 18 may indirectly instruct media player 14 to present a media asset by navigating a web browser application to a web page in which the media asset is embedded. In this second example, the web browser application may automatically instruct media player 14 to present the media asset.

When media player 14 is instructed to present a media asset, media player 14 may directly or indirectly instruct download agent 16 to retrieve the media asset. For example, media player 14 may use inter-process communication to directly instruct download agent 16 to retrieve the media asset. In another example, media player 14 may instruct an operating system of client device 4 to retrieve the media asset. In this example, the operating system may instruct download agent 16 to retrieve the media asset.

When download agent 16 is instructed to retrieve the media asset, download agent 16 may cause network interface 6 to output a playback rate request to a delivery information server 20 via network 8. The request may specify a resource identifier of the media asset. For example, download agent 16 may cause network interface 6 to output a Hypertext Transfer Protocol (HTTP) request that specifies a Uniform Resource Locator (URL) of the media asset. Delivery information server 20 may or may not be operated by MCP 7. For example, delivery information server 20 may be operated by a third party. In other words, delivery information server 20 may be operated by a service that is independent of MCP 7.

Delivery information server 20 may be configured to implement a data transfer policy established by MCP 7. The data transfer policy may indicate a desired overall bandwidth utilization during a transfer period of the version of the media asset. The desired overall bandwidth utilization is a bandwidth utilization that MCP 7 wants to maintain at a given point in time. For example, a data transfer policy may indicate that MCP 7 wants to maintain of 100 megabytes/second. A data transfer policy may indicate that MCP 7 wants to maintain different bandwidth utilization at different times. For instance, a data transfer policy may indicate that MCP 7 wants to maintain a bandwidth utilization of 100 megabytes/second between the hours of 5:00 AM and 9:00 PM and maintain a transfer rate of 90 megabytes/second between the hours of 9:00 PM through 4:59 AM. Examples of data transfer policy are disclosed in application No. 61/073,542, entitled "DYNAMIC MEDIA BIT RATES BASED ON ENTERPRISE DATA TRANSFER POLICIES," filed Jun. 18, 2008, the entire contents of which is incorporated herein by reference.

When delivery information server 20 receives a request from client device 4 that indicates a media asset, delivery information server 20 may, in response to the request, select a version of the media asset from the versions of the media asset such that when MCP 7 transfers the version of the media asset at a throughput rate substantially equal to the playback rate associated with the version of the media asset, an anticipated overall bandwidth utilization of MCP 7 is substantially equal to a desired overall bandwidth utilization at all times during a transfer period of the version.

After delivery information server 20 selects the version of the media asset, delivery information server 20 may cause MCP 7 to transfer the selected version of the media asset. Delivery information server 20 may cause MCP 7 to transfer the selected version of the media asset in a variety of ways. For example, delivery information server 20 may send a message to client device 4 that directly or indirectly indicates the selected playback rate. When client device 4 receives the message from delivery information server 20, download agent 16 may cause network interface 8 to output a request to media server 5 for a version of the media asset having the selected playback rate. For example, delivery information server 20 may send a message to client device 4 that specifies the selected playback rate, thereby directly indicating the selected playback rate. In this example, download agent 16 may send a request to media server 5 that specifies a resource identifier of the media asset and the selected playback rate. In another example, delivery information server 20 may send a message to client device 4 that specifies a resource identifier associated with a version of the media asset having the selected playback rate.

In an alternative implementation, when download agent 16 is instructed to retrieve the media asset, download agent 16 may cause network interface 6 to output a request for the media asset to media server 5. The request may specify a resource identifier of the media asset. When media server 5 receives the request, media server 5 may send a request to delivery information server 20 for a bit rate of the requested media asset. In response, delivery information server 20 may select a playback rate of the requested media asset and send a playback rate of the requested media asset to media server 5. Media server 5 may then send a version of the requested media asset having the selected playback rate to client device 4.

In some examples, delivery information server 20 may not be needed. In such examples, download agent 16 may transmit a request for a media asset directly to media server 5 via network 8. Media server 5 may select the version of the media asset based on an established throughput rate to client device 4. For example, after media server 5 receives a request for a media asset, media server 5 may perform some form of "handshaking" with client device 4 to determine a throughput rate to client device 4. Media server 5 may select the version of the media asset based on the determined throughput rate. The selected version of the media asset may be encoded for an overall average playback rate that is substantially similar, but less than, the determined throughput rate.

The selection of the media asset based on delivery information server 20 or some form of handshaking are merely examples. Media server 5 may select a version of the media asset based on any technique known in the art. This disclosure is not limited to the technique used to initially select the version of the media asset that is initially provided to client device 4.

As described herein, download agent 16 is capable of dynamically selecting and transitioning between different playback rates for delivery of the requested media asset provided by media server 5. For example, download agent 16 is capable of dynamically interrupting download and playback of the media asset at the currently selected playback rate representation and initiating download of the same media asset at a different playback rate representation. Download agent 16 forecasts and initiates the switch of the playback rate presentation for the media asset such that seamless transition occurs from the current playback rate representation of the media asset to the new playback rate representation of the media asset at the same time-based playback point within both representations. As a result, the transition is seamless to the end-user 18 without introducing delay or jitter and without requiring restart of the content delivery for the selected media asset. Moreover, the client-side initiation of the dynamic transition by download agent 16 between the different playback rate representations may avoid any requirement that the client device 4 report download and playback quality to delivery information server 20 or media server 5.

Figure 2:
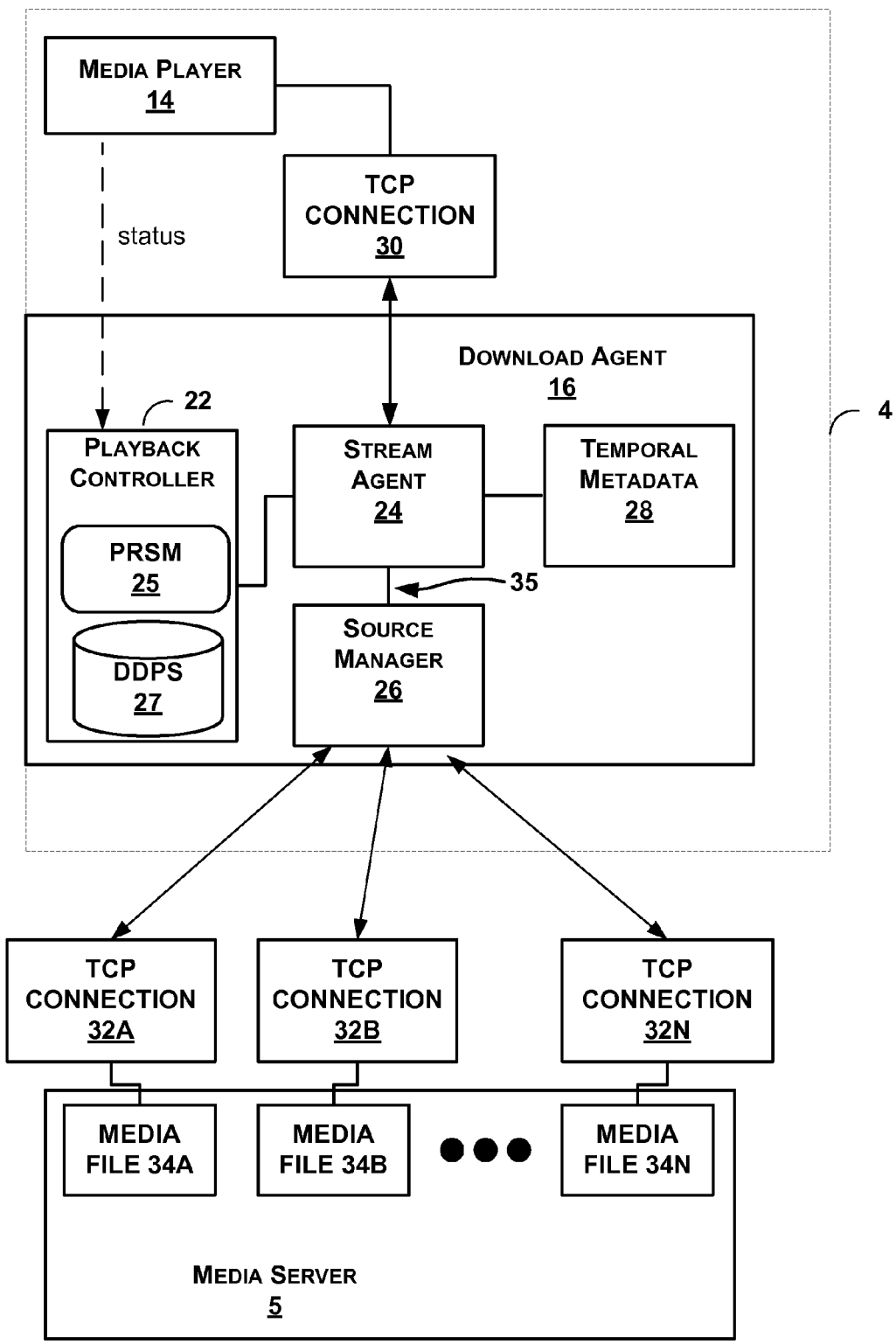
FIG. 2 is a block diagram illustrating an exemplary download agent connected to a media server.

FIG. 2 is a block diagram illustrating an exemplary download agent 16 connected to a media server 5. For clarity, the other components on client device 4 have been omitted to show the relationship between download agent 16 and media server 5. In the example embodiment, download agent 16 includes playback controller 22, stream agent 24, source manager 26, and temporal metadata 28. For purpose of example, media player 14 is shown as external to download agent 16, however, as described above, download agent 16 may encapsulate media player 14.

As shown in FIG. 2, download agent 16 provides content to media player 14 via a single TCP connection 30 internal to client device 4. Download agent 16 may, for example, open and maintain a single socket connection for communication of downloaded media content to media player via TCP connection 30. In this example, TCP connection 30 may be a standard transmission control protocol (TCP) connection used in Open Systems Interconnection Basic Reference Model (OSI). TCP connection 30 remains constant between media player 14 and download agent 16 regardless of the playback rate representation(s) of a particular media asset that are being downloaded by download agent 16; download agent seamlessly splices the different playback rates of the media asset onto TCP connection 30 so that media player 14 is unaware of any dynamic playback rate switches selected by download agent 16.

Media server 5 may include a plurality of media files 34A-34N (herein referred to as "media files 34") that generally represent exemplary media assets. Media files 34 may each contain similar content (e.g., the same movie), but at different encoding quality (e.g., different playback rates). As shown in FIG. 2, download agent 16 may initiate and establish a plurality of different TCP connections 32A-32N (herein referred to as "TCP connections 32") through network 8 for downloading one or more of media files 34 from media server 5.

In general, source manager 26 handles connection management for access and retrieval of data from media files 34 within media server 5. Source manager 26 handles all specific implementation details necessary for acquiring the media data and providing the data to stream agent 24. In this example, source manager implements a plurality of TCP network stacks and may concurrently handle multiple TCP connections 32 to media server 5. Source manager 26 de-multiplex the input data streams from media files 34 as directed by stream agent 24.

Media files 34 may each have similar content, such as the same movie, real-time data stream or other media, but the quality and playback rate of each file may vary. For example, media file 34A may contain a low-quality representation for consumption and a playback rate of 200 kbits/second, media file 34B may contain a second, medium quality representation of the media for consumption and a playback rate of 700 kbits/second, and media file 34N may contain a third, highest-quality representation of the media for consumption and a playback rate of 1200 kbits/second.

In the context of video, each of media files 34 typically contains a plurality of video frames encoded in accordance with a video compression scheme. One type of frame is referred to as a key frame or intra picture that can be decoded without reference to other frames and may, for example, provide an entire encoded picture. The term "key frame" is used herein to generally refer to this type of frame within an encoded media stream. In the context of H.264 coding, key frames are referred to as "i-frames." Between each key frame are predicted pictures or bi-predicted pictures that generally contain image data and motion vector displacements that are relative to the previous key frame in the media file. Download agent 16 coordinates and initiates dynamic transition such that the cut-over between playback rates from one of media files 34 to another occurs at a video frame that is not dependent on other video frames within the stream, i.e., a key frame.

In general, stream agent 24 is responsible for serializing disparate streams of media files 34 into a valid output stream for delivery to media player 14 via TCP connection 30 while additionally performing any required transformations to the stream data in the form of dynamic bit rate transitions. Upon an initial request by user 18 to download a particular media asset, stream agent accesses all of the respective media files 34 having different playback rate representations of the media asset and downloads metadata contained within a first segment of each of the media files. For example, the metadata within each of media files 24 may indicate that video frames in the media object are encoded for a certain playback rate and are in accordance with the H.264 format and are to be presented at a rate of 35 frames per second. In addition, the metadata may indicate other data such as copyright information, whether the media is to be presented in black and white, information that identifies an artist associated with the media object, and other information. Moreover, the metadata contained within each of media files 34 includes a key frame list that indicates byte indexes associated with key frames for the respective media file.

Based on the downloaded metadata, generates temporal metadata 28 that correlates the time stamps for key frames for the different media files 34 to byte offsets in the various media file formats. For example, temporal metadata 28 may be arranged as an array or other data structure that identifies sets of key frames having substantially similar time offsets within the media to be presented (e.g., a first set of key frames having a key frame selected from each of the media files at approximately 3 seconds of playback, a second set of key frames associated with approximately 7 seconds of playback, and the like). Temporal metadata 28 then correlates the key frames of each of the sets to appropriate byte offsets within media files 34. In this way, the byte offsets within media files for temporally proximate key frames are correlated and stored within temporal metadata 28. An example technique for correlating the time stamps to key frames is provided in application Ser. No. 12/252,782, entitled "MEDIA PLAYBACK POINT SEEKING USING DATA RANGE REQUESTS," filed Oct. 16, 2008, which claims priority to 60/981,164, filed Oct. 19, 2007, the entire contents of each is incorporated herein by reference.

In some embodiments, temporal metadata 28 may not be part of download agent 16. Instead temporal metadata 28 may reside on either media server 5 or delivery information server 20. In these embodiments, download agent 16 may receive a list of key frames for each one of media files 34 from media server 5 or delivery information server 20. The key frame for each one of media files 34 may already by temporally proximate to one another. Additionally, media server 5 or delivery information server 20 may correlate the byte offsets within media files 34 for temporally proximate key frames for media files 34.

Stream agent 24 interacts with source manager 26 to request data from specific portions of media files 34 and blends data from the disparate streams of media files 34 into a valid output stream 35 while performing any required transformations to the stream data. For example, source manager 24 may request particular segments of media files 34 and extract the application-layer media data from each media file for placement into a respective "container." Stream agent 24 may then interact with the appropriate software container of source manager 26 to retrieve the appropriate media data. Stream agent 24 may be preprogrammed to perform actions on specific media file formats such as Flash Format (FLV) used by Adobe Flash Player, provided by Adobe Systems, Inc., Advanced System Format (ASF) used by Windows Media Player, provided by Microsoft Inc., or other media file formats. Stream agent 24 may also ensure that download from each media file 34 is forecasted based on conditions and that the resultant data stream are stitched together at temporally correlated key frames. In this manner, user 18 viewing media player 14 may be oblivious to the automated functions of download agent 16.

Playback controller 22 provides high-level control logic to determine what actions should take place based on various conditions, including environmental, buffered data in view of tolerances, actual bandwidth, utilization of computing resources of client device 4, bandwidth pricing, and the like. During this process, playback controller 22 may monitor playback status such as current playback timestamp or current playback frame rate of media player 14. Based on these inputs, playback controller 22 provides playback rate guidance to request stream agent 24 to select a higher or lower playback rate media file 34.

Media files 34 have been described as media files with similar content but with varying playback rates. This feature of media files 34 is merely exemplary. In some instances, in the context of video, media files 34 may contain similar content and be transmitted at the same playback rate, however each one of media files 34 may be optimized for a certain display resolution. In these instances download agent 16 may determine the display resolution from media player 14. The display resolution may be set based on factors such as the display resolution capabilities of the client device. The playback status may include the display resolution. If the playback status of media player 14 is not ideal, download agent 16 may dynamically select a higher resolution or lower resolution media file from media files 34 in techniques similar to the ones described above. In instances where the client device can only display a certain maximum resolution, download agent 16 may only select media files 34 that are optimized for the maximum client device resolution or media files 34 that have lower resolution than the maximum client device resolution, even if the playback status indicates that one of media files 34 with higher resolution than the maximum client device resolution can be played.

In some instances, the media files may have similar content and encoded for the same playback rate, however, the encoding of media files 34 may be different. Media files 34 may be encoded with different encoding schemes. Each encoding scheme may require different amounts of computing resources on the client device. An encoding scheme that requires more computing resources than others may contain higher quality data. Similarly, an encoding scheme that requires less computing resources than others may contain lower quality data. Download agent 16 may dynamically select a different one of media files 34 based on the computing resources of the client device. For example, in some instances the client device may have poor computing resources for a certain amount of time due to computing resources taken up by other programs running on the client device. Playback status may indicate duration of time when the computing resources are poor. In that time frame, download agent 16 may select one of media files 34 that requires lower computing resources, and then dynamically select one of media files 34 that requires more computing resources when computing resources on the client device are freed up. For example, one of media files 34 may be encoded with the VP6 scheme. The VP6 scheme generally requires less computing resources, but the data quality may be poor. Another one of media files 34 may be encoded with the H.264 scheme. The H.264 scheme generally requires more computing resources, but the data quality may be higher. One of media files 34 encoded with the VP6 scheme may be encoded for the same playback rate as one of media files 34 encoded with the H.264 scheme. Download agent 16 may dynamically select between the media file encoded with the VP6 scheme and the media file encoded with the H.264 scheme based on the computing resources of the client device. The VP6 and H.264 schemes are merely exemplary; other encoding schemes may also be used. Download agent 16 may select between different media files 34 with different encoding schemes in techniques similar to the ones described above.

In some instances, all media files 34 may contain similar media content. However, some media files 34 may be encoded for different playback rates, some media files 34 may be optimized for a certain resolution, and some media files 34 may be encoded differently. In this instance, download agent 16 may dynamically select between media files 34 by taking into account the playback rate, resolution, and encoding scheme to select the optimal file from media files 34 in techniques similar techniques to the ones described above.

In one example implementation, playback controller 22 may include a playback rate selection module (PRSM) 25 that maintains a data delivery policy storage module (DDPS) 27. Although illustrated as located within client device 4, PRSM 25 and DDPS 27 may be located remote from the client device, such as within media server 5 or delivery information server 20. PRSM 25 aids playback controller 22 in the selection of the version of the media asset from the available versions of the media asset, i.e., the different media files 34 in the example of FIG. 2. Data delivery policy storage 27 may store a wide variety of data delivery policies that serve a wide variety of business purposes. Notably, in some examples, PRSM 25 and DDPS 27 may not be necessary. Playback controller 22 may include PRSM 25 and DDPS 27 in some non-limiting examples.

In one example, a network service provider may charge higher rates for data transferred during certain peak hours of day when overall network traffic is higher. For instance, overall network traffic may be highest between 4:00 PM and 7:00 PM. In this example, data delivery policy storage module 44 may store a data delivery policy that indicates that the client wishes a lower overall bandwidth utilization during the peak hours and that indicates a relatively higher overall bandwidth utilization during off-peak hours. PRSM 25 may select versions of media assets having lower playback rates during peak hours and may select versions of media assets having higher playback rates during off-peak hours.

In another example, a data transfer policy may indicate different overall bandwidth utilization for different classes of media assets. Data transfer policies may classify media assets in a wide variety of ways. For instance, data transfer policies may classify media assets by subject matter, popularity, commercial significance, user ratings, creation date, author/artist, or other factors. In another instance, a data transfer policy may classify media assets by playback lengths of media assets. In this instance, the data transfer policy may indicate an overall bandwidth utilization of 100 megabytes/second for media assets having playback lengths between zero minutes and five minutes, an overall bandwidth utilization of 150 megabytes/second for media assets having playback lengths between five minutes and ten minutes, and an overall desired data transfer rate of 80 megabytes/second for media assets having playback lengths longer than ten minutes. Furthermore, in this instance, when VSM 42 receives a request for a media asset having a playback length of six minutes, VSM 42 may select a version of the media asset such that when MCP 7 transfers the version of the media asset at an overall bandwidth utilization is substantially equal to the playback rate of the version, the anticipated overall bandwidth utilization of media assets having playback lengths between 5 and 10 minutes is substantially equal to 150 megabytes/second.

In another example, a data transfer policy may indicate different overall desired bandwidth utilization for different classes of users. Data transfer policies may classify users in a wide variety of ways. For instance, data transfer policies may classify users based on home postal code, length of relationship with MCP 7, commercial significance, and other factors.

In another example, a server side data delivery policy storage module may set the maximum bandwidth utilization for a client device. The server side data delivery policy storage module may set the maximum bandwidth utilization for a client device based on transmission availability, bandwidth cost, relationship with client, and the like. For example, during peak usage hours, the server side data delivery policy storage module may set a maximum bandwidth utilization for each user to unsure that every user can access media files 34. In another example, the server side data delivery policy storage module may set a maximum overall bandwidth utilization to reduce the costs of transmission. In yet another example, the server side data delivery policy storage module may set different maximum overall bandwidth utilization based on the user. Where a particular user is an important customer, the server side data delivery policy storage module may set a higher maximum bandwidth utilization than the maximum bandwidth utilization for other users.

In embodiments where the server side data delivery policy storage module sets a maximum bandwidth utilization, server side data delivery policy storage module may transmit the maximum bandwidth utilization to DDPS 27. DDPS 27 may cause PRSM 25 to only select media files 34 that are encoded for a playback rate this is less than the maximum bandwidth utilization.

To reiterate, though PRSM 25 and DDPS 27 are shown in FIG. 2, in some examples PRSM 25 and DDPS 27 may not needed, i.e. may not be located within client device 4 or media server 5. Further as explained above, in some examples delivery information server 20 may not be needed, accordingly in such examples, PRSM 25 and DDPS 27 may not be located within delivery information server 20. Examples of maintaining an overall bandwidth utilization, and establishing bandwidth utilization for users is described in application No. 61/073,542, entitled "DYNAMIC MEDIA BIT RATES BASED ON ENTERPRISE DATA TRANSFER POLICIES," filed Jun. 18, 2008, the entire contents of which is incorporated herein by reference.

As described above, media files 34 contain media content that was previously generated and stored in the media files. However, in some aspects, the media content of media files 34 may be live data, e.g., transmission of a live concert. Examples for allowing client device 4 to download live data are provided in application No. 61/052,459, entitled "LIVE MEDIA DELIVERY OVER A PACKET-BASED COMPUTER NETWORK," filed May 12, 2008, the entire contents of which is incorporated herein by reference. Furthermore, in some examples, client device 4 may swarm the data from one or more servers, i.e. download the media files in parallel from one or more media servers 5. Examples of swarming and downloading media files in parallel are provide in U.S. Pat. No. 7,277,950, entitled "APPARATUS, METHOD AND SYSTEM FOR AN ACKNOWLEDGEMENT INDEPENDENT EQUALIZED DATA PACKET TRANSFER MECHANISM OVER A PEER TO PEER NETWORK," issued Oct. 2, 2007 and application Ser. No. 10/788,695, entitled "PARALLEL DATA TRANSFER OVER MULTIPLE CHANNELS WITH DATA ORDER PRIORITIZATION," filed Feb. 27, 2004, the contents of each is incorporated herein by reference.

Figure 3:
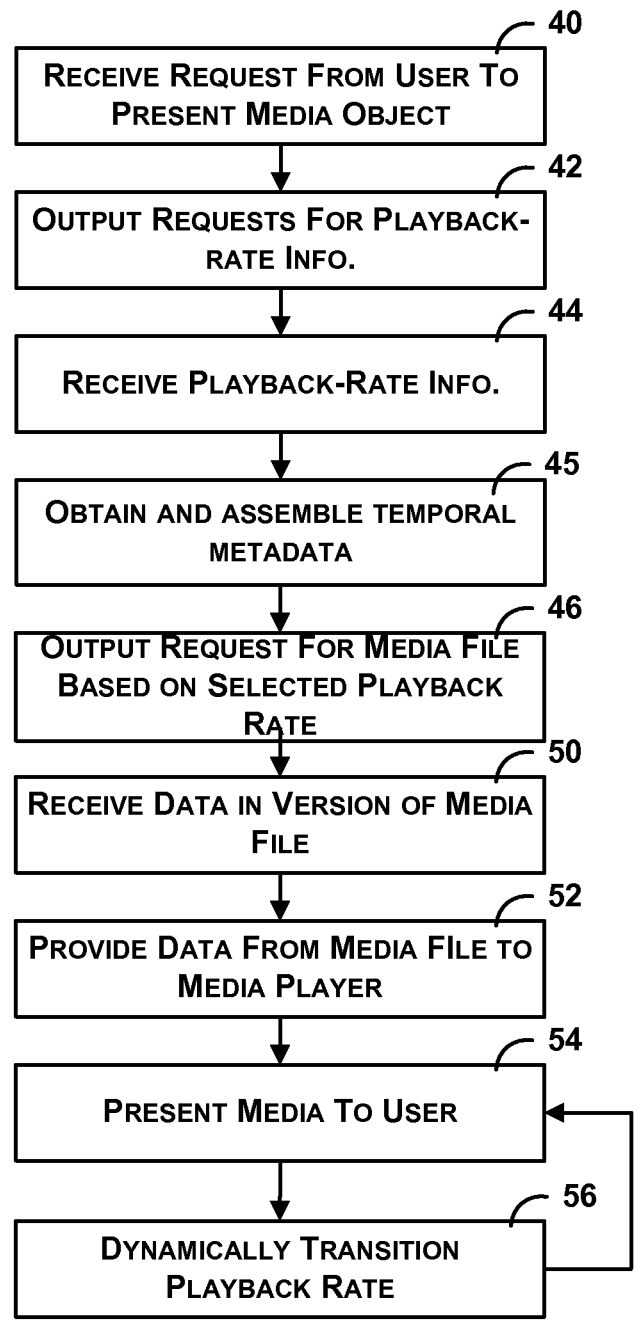
FIG. 3 is a flowchart illustrating an example operation of the download agent.

FIG. 3 is a flowchart illustrating example operation of client device 4. Initially, media player 14 receives a request from user 18 to present a media asset (40). When media player 14 receives the request to present the media asset, download agent 16 outputs a request to delivery information server 20 for information related to different playback rate representations of the media asset (42). Subsequently, client device 4 may receive a message from delivery information server 20 that identifies the various media files 34 that represent the different playback rate representations (44). For example, download agent 16 may receive a message (e.g., in the form of a web page) from delivery information server 20 that includes a set of URLs to the different playback rate representations of the media asset, i.e., media files 34.

Next, download agent 16 accesses all of the respective media files 34 having different playback rate representations of the media asset and downloads metadata contained within a first segment of each of the media files (45). For example, the download agent 16 retrieves the first segment of data from each of the media files 34 associated with the media asset and extracts the metadata, including the key frame list that indicates byte indexes and timestamps associated with key frames for the respective media file. Download agent correlates the timestamps for key frames for the different media files 34 to byte offsets in the various media file formats and stores the results within temporal metadata 28.

As one example, in an exemplary implementation in which client device 4 uses HTTP to request and receive data of the media object, client device 4 may, for example, output a set of initial HTTP requests that each includes, in a header of the HTTP request, a resource identifier associated with all data in the media object and a range element that specifies the first segment containing the metadata. In this example, the range element may specify the first range by specifying a byte index of a first byte and a byte index the last byte of the range. For instance, each of the initial HTTP requests may specify the resource identifier "/media/video_clip.flv" and the range element may specify the first range by specifying that the first range starts at byte 0 of the media object and ends at byte 100 of the media object. In this instance, an example initial HTTP request may appear in part as:

```
GET /media/video_clip.flv HTTP/1.0
Range: bytes=0-100
```

Next, download agent 16 selects one of the playback rate representations (i.e., one of media files 34) based on various conditions and/or user input, and outputs a request to receive additional data from the media file corresponding to the selected playback rate (46). For example, download agent 16 may generate an HTTP request that specifies the resource identifier associated with the selected media file 34 and specifies a second range of data within the media object. For example, client device 4 may output a second HTTP request that includes, in a header of the second HTTP request, the resource identifier associated with all data in the media object and a range element that specifies the second range. In this example, the range element may specify a second range by specifying a byte index of a first byte of the second range and a byte index of the last byte of the second range. For instance, the second HTTP request may specify the resource identifier "/media/video_clip.flv" and the range element may specify the second range by specifying that the second range starts at byte 200 of the media object and ends at byte 1000 of the media file. In this instance, the second HTTP request may appear as:

```
GET /media/video_clip.flv HTTP/1.0
Range: bytes=200-1000
```

After download agent 16 generates the request for the version of the media asset that has the indicated playback rate, download agent 16 output the request to media server 5 via network 8 (48). Subsequently, network interface 6 receives data via network 8 for the media file 34 that has the appropriate playback rate representation (50).

As network interface 6 receives data in the version of the media asset, source manager 26 makes the data available to stream agent 24, which retrieves the encoded media data and provides it so media player 14 via TCP connection 30 (52). Media player 14 decodes the media data of the media file and presents the media to user 18 (54).

During this process, playback controller 22 monitors playback status including the current playback timestamp of the media and/or the current playback frame rate of media player 14. In addition, playback controller 22 monitors various conditions, including an amount of buffered data that has been downloaded and yet to be consumed by media player 14 in view of defined tolerances, an actual bandwidth achieved by the download, a utilization of computing resources of client device 4, bandwidth pricing for the current download, and the like. In some examples, based on these inputs, playback controller 22 invokes PRSM to determine whether a dynamic transition to a different playback rate representation is in order. If so, playback controller 22 outputs a playback rate guidance message to request stream agent 24 to select a higher or lower playback rate media file 34 (56). As described above, in some examples PRSM may not be necessary. In such examples, playback controller 22 does not invoke PRSM, instead, playback controller 22 dynamically selects a higher or lower playback rate media 34 (56).

Figure 4:
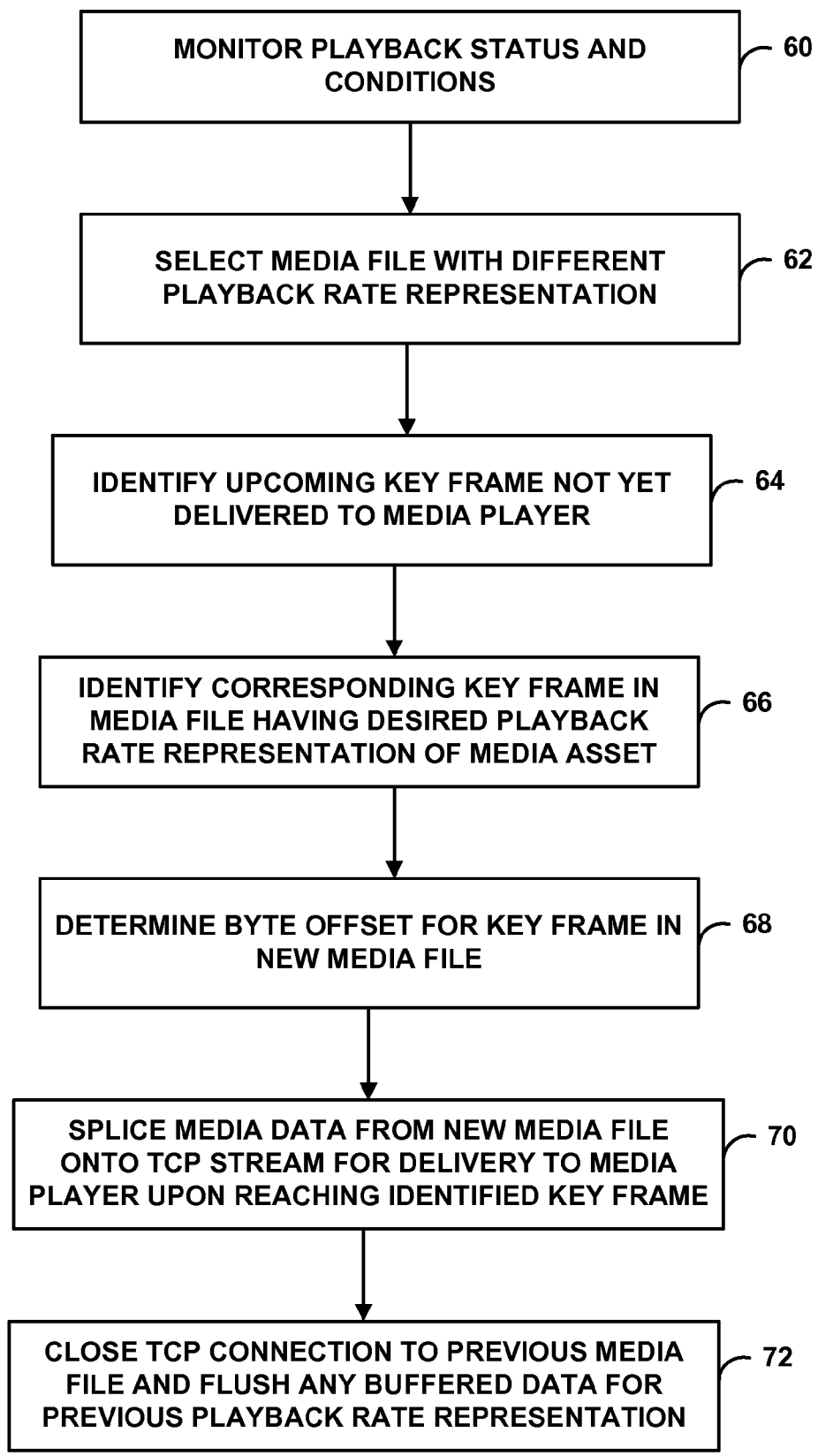
FIG. 4 is a flow chart illustrating example operation of download agent when dynamically transitioning between different bit rate representations of the media.

FIG. 4 is a flow chart illustrating an example operation of download agent 16 when dynamically transitioning between different playback rate representations of the media. Stream agent 24 controls the flow of media data to media player 14 such that data is generally delivered as need by the media player without substantial data buffering by the media player. In other words, source manager 26 provides internal data buffering and stream agent 24 extracts and provides the data to media player 14 at a rate generally equal to the playback rate at which the media is to be consumed and presented to the user. During this process, playback controller 22 closely monitors the playback status of media player 14 (60). The playback status includes the current playback timestamp or current playback frame rate so as to reflect a current position of the media player 14 with respect to playback of the current media asset. In addition, playback controller 22 monitors an amount of data that has been downloaded and buffered and yet to be consumed by media player 14 in view of defined tolerances, an actual bandwidth achieved by the download, a utilization of computing resources of client device 4, bandwidth pricing for the current download, and the like.

Based on these inputs, playback controller 22 provides playback rate guidance to request stream agent 24 to select a higher or lower playback rate media file 34 as necessary (62). In one example, playback controller 22 monitors the amount of buffered data, i.e., any media file frames temporarily stored before being presented to media player 14 for display. The buffer size may be measured as a unit of time or as a unit of bits. Playback controller 22 may determine whether the playback rate of media player 14 (i.e., the rate of consumption of media data by the media player) exceeds the actual throughput rate. If the amount of buffered data is frequently below a desired threshold amount, playback controller 22 may determine that the playback rate exceeds the actual throughput rate and may direct stream agent to select a lower quality media file.

As another example, if the amount of buffered data consistently exceeds a desired threshold amount, playback controller 22 may determine that the actual throughput rate exceeds the playback rate and may cause stream agent 24 to select a different media file that having a higher-quality playback-rate representation of the media.

In any event, in response to an instruction to dynamically transition to a new playback rate, stream agent 24 accesses temporal metadata 28 and identifies a temporal location for an upcoming key frame of the current playback rate representation that has not yet been delivered to media player 14 (64). For example, stream agent 24 analyzes the key frame list of the metadata to look forward with respect to the playback time and identifies an upcoming key frame.

Stream agent 24 then analyzes the temporal metadata 28 to identify a corresponding key frame in the other media file 34 for the playback rate to which download agent is transitioning (i.e., a key frame of the targeted media file that has the same timestamp as the identified upcoming key frame in the current bit rate representation) (66). Stream agent then determines a byte offset for the key frame for the media file for the newly selected playback rate and outputs a request to direct source manager 26 to retrieve a data segment that includes the identified key frame. (68)

Stream agent 24 then continues to deliver the buffered media data (i.e., data for the current bit rate representation) to media player until the identified, upcoming key frame is reached. At this point, stream agent retrieves and extracts media data from source manager 26 for the new playback rate, and seamlessly delivers the media data to the media player 14 by the same TCP connection 30 (70). In this way, download agent 16 seamlessly splices the different playback rates of the media asset onto TCP connection 30 so that media player 14 is unaware of any dynamic playback rate switches selected by download agent 16.

After successfully splicing the media data from the newly selected media file on the TCP connection, stream agent 24 may direct source manager to close the previous TCP connection used to retrieve media data from the media file having the previously selected playback rate representation (72). At this point, source manager 26 may flush any buffered data associated with the previous playback rate representation of the media asset.

In another embodiment, download agent 16 may select a different one of media files 34 at a timestamp of a difference frame in the file currently being played. A difference frame may be a frame that is encoded with the aid of one or more frames. Some examples of difference frames are predictive frames or bi-directional frames. The timestamp of the difference frame in the file currently being played may be temporally proximate to a timestamp of a key frame in the selected media file. The key frame in the selected media file may not be the first frame of the selected media file. In this embodiment, download agent 16 may receive a list of timestamps for certain difference frames from delivery information server 20 or media server 5. Download agent 16 may also generate a list of timestamps for difference frames in similar techniques as the ones described above. Download agent 16 may dynamically select between different media files 34 at difference frames in techniques similar to the ones described above.

The code may be executed by one or more processors, such as one or more digital signal processors ("DSPs"), general purpose microprocessors, application-specific integrated circuits ("ASICs"), field programmable logic arrays ("FPGAs"), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder ("CODEC").

Various embodiments of the invention have been described. These and other embodiments are within the scope of the following claims.

The invention claimed is:

1. A method comprising:
    determining, by a device including a processor, a playback status of a first version of a media content being concurrently downloaded and played on a media player, wherein the playback status indicates whether an overall bandwidth utilization of a connection employed for the downloading meets a threshold associated with a desired overall bandwidth utilization indicated in a data transfer policy, wherein the desired overall bandwidth utilization is based upon a monetary rate for data transfer on the connection at a time period associated with the downloading of the first version of the media content, and wherein the connection has associated a plurality of time periods with respective monetary rates for data transfer;
    in response to the overall bandwidth utilization not meeting the threshold associated with the desired overall bandwidth utilization, selecting a second version of the media content to download that is anticipated to cause the overall bandwidth utilization to meet the threshold associated with the desired overall bandwidth utilization; and
    identifying a frame of the second version of the media content at which to transition playing from the first version of the media content to the second version of the media content .

2. The method of claim 1, further comprising downloading the second version of the media content beginning at the identified frame.

3. The method of claim 1, wherein the desired overall bandwidth utilization is further based upon a class associated with the media content from a plurality of classes based upon at least one factor of the media content.

4. The method of claim 3, wherein the at least one factor includes at least one of subject matter, popularity, commercial significance, user rating, creation date, author, artist or playback length.

5. The method of claim 1, wherein the desired overall bandwidth utilization is further based upon a class of user associated with the media player.

6. The method of claim 1, wherein the first version of the media content is encoded for a first playback rate, wherein the second version of the media content is encoded for a second playback rate that is higher than the first playback rate.

7. The method of claim 1, wherein the first version of the media content is encoded for a first playback rate, wherein the second version of the media content is encoded for a second playback rate that is lower than the first playback rate.

8. The method of claim 1, wherein the identified frame is a key frame.

9. A system, comprising:
    a processor; and
    a memory communicatively coupled to the processor, the memory having stored therein computer-executable instructions, comprising:
    a playback controller configured to determine a playback status a first version of a media content being concurrently downloaded and played on a media player, wherein the playback status indicates whether an overall bandwidth utilization of a connection employed for the downloading meets a threshold associated with a desired overall bandwidth utilization indicated in a data transfer policy, wherein the desired overall bandwidth utilization is based upon a monetary rate for data transfer on the connection at a time period associated with the downloading of the first version of the media content, and wherein the connection has associated a plurality of time periods with respective monetary rates for data transfer;
    a source manager configured to, in response to the overall bandwidth utilization not meeting the threshold associated with the desired overall bandwidth utilization, select a second version of the media content to download that is anticipated to cause the overall bandwidth utilization to meet the threshold associated with the desired overall bandwidth utilization; and
    a stream agent configured to identify a frame of the second version of the media content at which to transition playing from the first version of the media content to the second version of the media content.

10. The system of claim 9, wherein the stream agent is further configured to download the second version of the media content beginning at the identified frame.

11. The system of claim 9, wherein the desired overall bandwidth utilization is further based upon a class associated with the media content from a plurality of classes based upon at least one factor of the media content.

12. The system of claim 11, wherein the at least one factor includes at least one of subject matter, popularity, commercial significance, user rating, creation date, author, artist or playback length.

13. The system of claim 9, wherein the first version of the media content is encoded for a first playback rate, wherein the second version of the media content is encoded for a second playback rate that is higher than the first playback rate.

14. The system of claim 9, wherein the first version of the media content is encoded for a first playback rate, wherein the second version of the media content is encoded for a second playback rate that is lower than the first playback rate.

15. The system of claim 9, wherein the desired overall bandwidth utilization is based upon a class of user associated with the media player.

16. A non-transitory computer-readable medium having instructions stored thereon that, in response to execution, cause at least one device including a processor to perform operations comprising:
    determining a playback status of a first version of a media content being concurrently downloaded and played on a media player, wherein the playback status indicates whether an overall bandwidth utilization of a connection employed for the downloading meets a threshold associated with a desired overall bandwidth utilization indicated in a data transfer policy, wherein the desired overall bandwidth utilization is based upon a monetary rate for data transfer on the connection at a time period associated with the downloading of the first version of the media content, and wherein the connection has associated a plurality of time periods with respective monetary rates for data transfer;

in response to overall bandwidth utilization not meeting the threshold associated with the desired overall bandwidth utilization, selecting a second version of the media content to download that is anticipated to cause the overall bandwidth utilization to meet the threshold associated with the desired overall bandwidth utilization; and identifying a frame of the second version of the media content at which to transition playing from the first version of the media content to the second version of the media content.

17. The non-transitory computer-readable medium of claim 16, the operations further comprising downloading the second version of the media content beginning at the identified frame.

18. The non-transitory computer-readable medium of claim 16, wherein the desired overall bandwidth utilization is based upon a class associated with the media content from a plurality of classes based upon at least one factor of the media content.

19. The non-transitory computer-readable medium of claim 18, wherein the at least one factor includes at least one of subject matter, popularity, commercial significance, user rating, creation date, author, artist or playback length.

20. The non-transitory computer-readable medium of claim 16, wherein the desired overall bandwidth utilization is based upon a class of user associated with the media player.

* * * * *